United States Patent [19]
Akiyama et al.

[11] Patent Number: 4,864,086
[45] Date of Patent: Sep. 5, 1989

[54] VEHICLE DECELERATION SENSOR

[75] Inventors: Akihiko Akiyama; Kazuo Higuchi; Hisakazu Okuhara; Hiroshi Tabata; Yoshiko Kinoshita, all of Saitama, Japan

[73] Assignee: Honda Giken Kogyo Kabushiki Kaisha, Tokyo, Japan

[21] Appl. No.: 132,257

[22] Filed: Dec. 14, 1987

[30] Foreign Application Priority Data

Dec. 19, 1986 [JP] Japan .................................. 61-303155
Dec. 2, 1987 [JP] Japan .................................. 62-305361

[51] Int. Cl.$^4$ ........................................... H01H 35/14
[52] U.S. Cl. .................................................. 200/61.53
[58] Field of Search ..................... 60/635, 636; 73/514, 73/517 R; 200/61.45 R, 61.48, 61.5, 61.53; 102/252, 253, 272, 274; 242/107.4 R, 107.4 A; 180/282; 280/806, 735, 735

[56] References Cited

U.S. PATENT DOCUMENTS

| | | | |
|---|---|---|---|
| 2,941,472 | 6/1960 | Lee et al. ............................. | 102/274 |
| 3,226,504 | 12/1965 | Gallistel et al. .................... | 200/61.53 |
| 3,974,350 | 8/1976 | Breed .................................. | 200/61.53 |
| 4,092,926 | 6/1978 | Bell ..................................... | 73/514 |
| 4,178,492 | 12/1979 | Roesch et al. ..................... | 200/61.5 |
| 4,204,703 | 5/1980 | Okada ............................... | 200/61.53 X |
| 4,580,810 | 4/1986 | Thuen ................................ | 280/734 |

FOREIGN PATENT DOCUMENTS

60-259553 12/1985 Japan .

Primary Examiner—J. R. Scott
Attorney, Agent, or Firm—Nixon & Vanderhye

[57] ABSTRACT

A deceleration sensor for detection for deceleration greater than a certain threshold level, comprising: a firing pin; a sensor mass which is guided for motion along a first direction in a casing and is urged by a first spring member along the first direction so as to oppose an inertia force that will be applied to the sensor mass as it experiences deceleration which is to be detected; a trigger arm which is pivoted at its base end and comprises a first free end which is urged by a second spring member into activating the firing pin and a second free end which is engaged with the sensor mass so as to oppose a rotational motion of the trigger arm under a biasing force of the second spring member; and a shoulder surface provided in the sensor mass for holding the trigger arm against the biasing force of the second spring member be being engaged with the trigger arm under a normal condition and releasing the trigger arm by being disengaged from the trigger arm when the sensor mass experiences acceleration greater than the threshold level. Since the frictional force involved in the engagement between the sensor mass and the trigger arm is drastically reduced, the state of the engagement can be controlled very precisely.

18 Claims, 12 Drawing Sheets

VEHICLE DECELERATION SENSOR

TECHNICAL FIELD

The present invention relates to a deceleration sensor for detecting a threshold level of vehicle deceleration indicative of a vehicle crash and activating a safety device such as a passive vehicle occupant restraint system, a seat belt tensioner and so on.

BACKGROUND OF THE INVENTION

A seat belt prevents an occupant of a vehicle from being thrown against the interior of the passenger compartment and other objects in the case of a vehicle crash and is desired to be free from any slack in view of the effectiveness of the seat belt to restrain the occupant in case of a crash but some slack is necessary for the comfort of the occupant under normal condition. Thus, it is advantageous to have some slack in the seat belt under normal condition and remove it upon detection of a vehicle crash. To accomplish this goal, Japanese patent laid open publication No. 60-259553 discloses a seat belt preloader device which rapidly retracts a certain length of the seat belt upon detection of a crash. U.S. Pat. No. 4,580,810 discloses an inflatable air bag which is normally stowed in a steering wheel but rapidly inflates upon detection of a vehicle crash to reduce the impact of the crash upon the occupant An acceleration sensor or a deceleration sensor for activating safety devices of these types typically comprises a sensor mass which is subjected to an inertia force when a vehicle crash occurs, a bias spring for restraining the sensor mass against an inertia force arising from a sub-threshold level deceleration and a trigger member which holds a spring loaded firing pin or the like in an inactive state by being engaged with the sensor mass. When the sensor mass is moved by the inertia force against the biasing force of the bias spring, the trigger member is disengaged from the sensor mass and releases the firing pin which, for instance, strikes a primer of a propellant cartridge.

Such a deceleration sensor for activating an occupant restraint system and other safety devices is required to be reliable in terms of its capability to be activated when required and to stay inactive when not required to be activated. However, according conventional devices for detecting a threshold level of deceleration indicative of a vehicle crash, since the biasing force of the bias spring which determines the threshold level of deceleration in relation with the mass of the sensor mass typically applies a certain pressure to the area of contact between the trigger member and the sensor mass, causing friction therebetween which tends to make the force required to disengage the sensor mass from the trigger member somehow unpredictable and causes the threshold level to be unstable.

BRIEF SUMMARY OF THE INVENTION

In view of such problems of the prior art, a primary object of the present invention is to provide a deceleration sensor which is simple in structure and is yet highly reliable by having a well defined threshold level.

Another object of the present invention is to provide a deceleration sensor having an accurate and reproducible threshold level.

Yet another object of the present invention is to provide a deceleration sensor which is reliable by being protected from mechanical failure.

According to the present invention, these and other objects of the present invention will be accomplished by providing a deceleration sensor for detection of deceleration or acceleration greater than a certain threshold level, comprising: an energy releasing means; a sensor mass which is guided for motion along a first direction in a casing and is urged by a first biasing means along the first direction so as to oppose an inertia force that will be applied to the sensor mass as it experiences deceleration or acceleration which is to be detected; a trigger member which is moveably supported and comprises a first free end which is urged by a second biasing means for causing the energy releasing means to be activated and a second free end which is engaged with the sensor mass so as to oppose a motion of the trigger member under a biasing force of the second biasing means; and an engagement means provided in the sensor mass for holding the trigger member against the biasing force of the second biasing means by engaging the sensor mass with the trigger member under a normal condition and releasing the sensor mass from the trigger member when the sensor mass experiences deceleration or acceleration greater than the threshold level. Preferably, the trigger member comprises a trigger arm which is pivoted at its base end.

Since the contact force involved in the engagement between the trigger arm and the sensor mass can be adjusted as desired by appropriate selection of the lever ratios of the first and the second free ends of the trigger arm, it is possible to control the friction involved in the engagement between the trigger arm and the sensor mass and a better control of the state of the engagement is made possible.

According to a preferred embodiment of the present invention, the sensor mass is pivoted to the casing at its upper end and a point of engagement between the sensor mass and the trigger arm is located substantially under the pivoted upper end of the sensor mass. In a favorable arrangement of the various parts according to the present invention, a distance of a vector of the biasing force acting upon the first free end of the trigger arm from the pivoted base end is smaller than a distance of a vector of a contact force acting between the engagement means of the sensor mass and the second free end of the trigger arm from the pivoted base end so that the friction involved in the engagement between the second free end of the trigger arm and the sensor mass can be reduced as desired.

Further, if the trigger arm extends substantially horizontally in its unreleased position and its gravitational center is located away from the pivoted base end thereof, a gravitational force acting upon the trigger arm can be directed to assist its motion that is to be effected by the biasing force of the second biasing means.

According to a certain aspect of the present invention, the energy releasing means comprises a propellant cartridge and a firing pin which is urged by the second biasing means into a position to ignite the propellant cartridge and is held against the biasing force of the second biasing means by the trigger arm. Preferably, the second biasing means comprises a compression coil spring and a torsion coil spring acting upon the trigger arm by way of the firing pin or a pair of compression coil springs abutting a rear end of the firing pin in a coaxial manner to the end of assuring its action even when one of the springs failed.

According to a further aspect of the present invention, the sensor mass is provided with an upward or downward facing shoulder surface extending substantially horizontally and the second free end of the trigger arm rests upon this shoulder surface of the sensor mass. Thereby, the sensor mass which will be displaced tangentially by the inertia force at the time of a crash can disengage the trigger arm without encountering undue resistance from the trigger arm.

According to a certain embodiment of the present invention, the sensor mass comprises a pair of sensor masses which engage the trigger member with individual engagement means in such a manner that even when only one of the engagement means releases the trigger member the energy releasing means is activated by the trigger member. Preferably, the sensor masses are pivoted independent from each other at their upper ends and are biased by separate first biasing means; and the trigger arm comprises a lateral pivot pin which is guided for a vertical motion by a vertical slot of the casing and held by an upward facing shoulder surface of one of the sensor masses, a first free end which is urged by the second biasing means into activating the energy releasing means and a second free end which is engaged with a shoulder surface of the other sensor mass in such a manner that the first free end is allowed to be driven by the second biasing means either when the lateral pin is disengaged from the upper shoulder surface of the one sensor mass and the trigger arm is pivoted about the second free end thereof under the biasing force of the second biasing means or when the second free end is disengaged from the shoulder surface of the other sensor mass and the trigger arm is pivoted about the lateral pin under the biasing force of the second biasing means, in either case, due to a displacement of the corresponding sensor mass under the inertia force.

This arrangement provides two deceleration sensors which can operate independent from each other to reduce the chance of mechanical failure. Preferably, the first free end and the second free end of the trigger arm are located on either side of the lateral pin and the shoulder surface of the other mass engaging with the second free end faces downward while the sensor masses are substantially U-shaped and one of them is accommodated inside the other without interfering each other.

In these arrangements, if a direction of the motion of the member of the energy releasing means under the biasing force of the second biasing means is substantially identical to a direction of the inertia force which will be applied to the sensor mass, the inertia force upon the said member assists its motion to activate the energy releasing means and the reliability of the sensor can be increased.

BRIEF DESCRIPTION OF THE DRAWINGS

Now the present invention is described in the following with reference to the appended drawings, in which:

FIGS. 9 and 10 are views similar to FIG. 4 showing the action of various parts as the seat belt is pulled in;

DETAILED DESCRIPTION OF THE INVENTION

Figure 1:
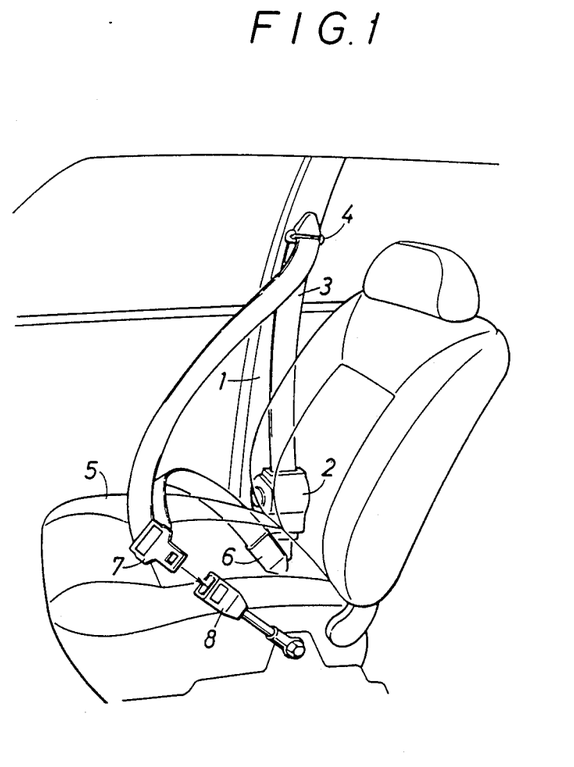
FIG. 1 shows a vehicle seat belt system to which the present invention is applied.

FIG. 1 shows the structure of a seat belt system to which the present invention is applied. The seat belt 3 extends from a belt retractor 2 which is fixed at a lower part of a center pillar 1 of the vehicle and is passed through a through ring 4 attached to an upper part of the center pillar 1 and then extends downwards. The free end 6 of this seat belt 3 is fixedly attached to a floor anchor which is located on one side of a seat 5. The span of the seat belt 3 between the floor anchor and the through ring 4 is passed through a tongue plate 7 so as to allow the movement of the tongue plate 7 along the seat belt 3. On the other side of the seat 5 is provided a buckle 8.

Thus, a driver or an occupant who has seated in the seat 5 can pull out the seat belt 3 from the belt retractor 2 and engage the tongue plate 7 with the buckle 8 to pass the seat belt across his chest and waist in a known manner.

Figure 2:
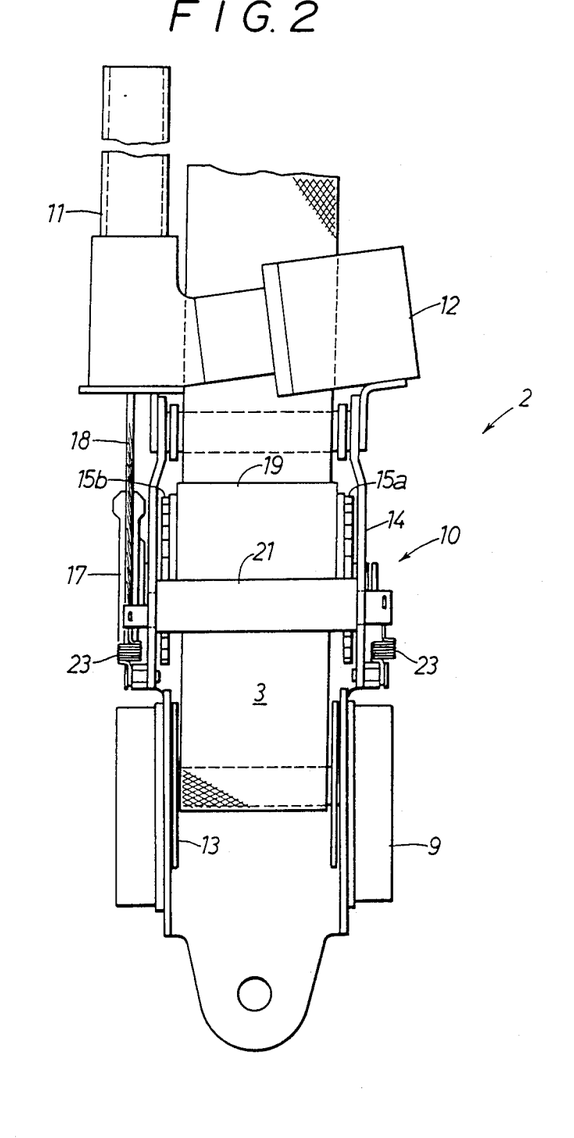
FIG. 2 shows an essential part of the seat belt system of FIG. 1.

As shown in FIG. 2, the seat belt retractor 2 is provided with a spring-loaded Emergency Locking Retractor (ELR) device 9 for retracting and paying out the seat belt 3 as required during normal operation of the seat belt system, a tensioner device 10 for removing a slack in the seat belt 3 at the time of a vehicle crash, a drive device 11 for supplying rotational power to the tensioner device 10, and a deceleration sensor 12 for detecting a deceleration which is indicative of a vehicle crash.

The ELR device 9 is provided with a spring means for applying a retracting force to a belt drum 13 for winding the seat belt 3 thereon and a ratchet means for preventing the seat belt 3 from being paid out from the drum 13.

The drive device 11 is equipped with a propellant cartridge for applying a thrust to a piston which in turn causes the rotation of the tensioner device 10 by way of a wire 18 connected to the piston. The propellant cartridge is ignited by the action of the deceleration sensor 12 comprising a firing pin and a sensor mass for driving the firing pin as described hereinafter.

Figure 3:
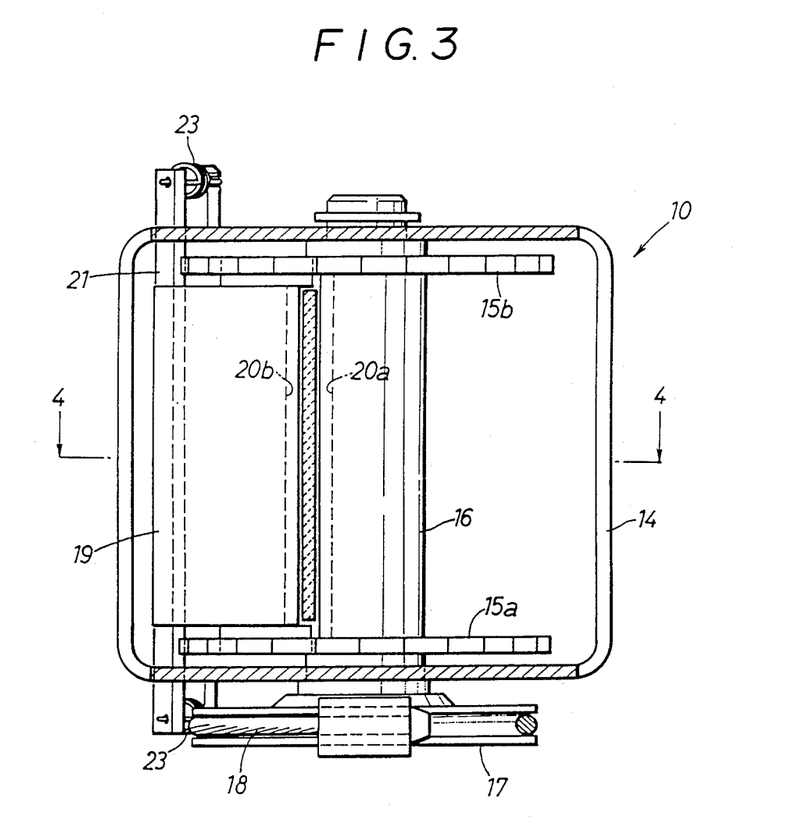
FIG. 3 is a longitudinal sectional view of the seat tensioner device of the seat belt system.

As best shown in FIG. 3, the casing 14 for the tensioner device 10 is bent from sheet metal and is internally provided with a pair of ratchet wheels 15a and 15b which are rotatably supported by a shaft 16 which is passed through the casing 14. The ratchet wheels 15a and 15b are integrally fixed to the shaft 16 and a pulley 17 is also integrally fixed to an end of the shaft 16 which projects outwardly from the casing 14. A wire 18 is passed around this pulley 17 and one end of this wire 18 is connected to an appropriate point of the pulley 17 while the other end of this wire 18 is connected to the drive device 11 for converting the tension applied to the wire 18 by the drive device 11 into a rotational force which causes the rotation of the ratchet wheels 15a and 15b.

Figure 4:
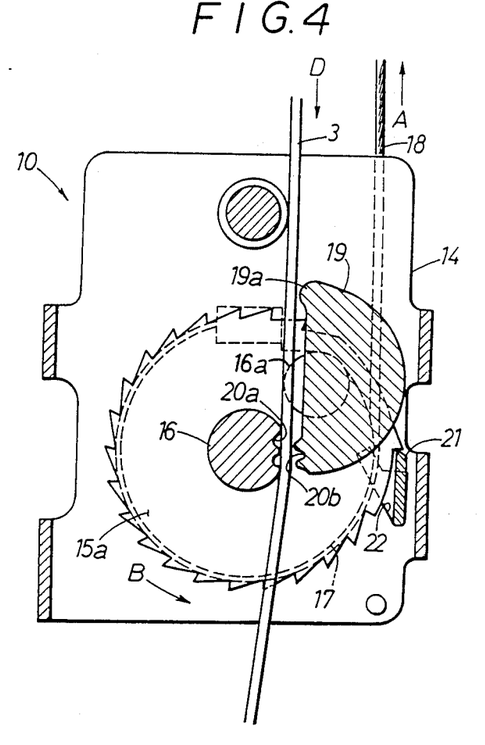
FIG. 4 is a cross-sectional view of the belt tensioner device along section lines IV—IV of FIG. 3.
Figure 5:
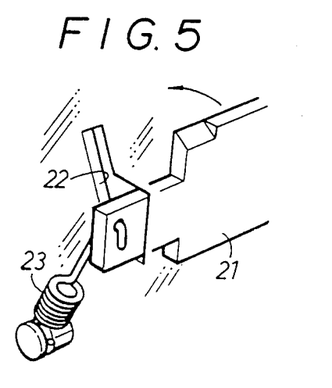
FIG. 5 is a perspective view of an end of the ratchet pawl.

As best shown in FIG. 4, a clamp cam 19 of a substantially semi-circular cross-section is interposed between the inner surfaces of the ratchet wheels, 15a and 15b in a freely rotatable manner about a shaft 16a which is substantially parallel with the rotational center line of the shaft 16. The opposing surfaces of the clamp cam 19 and the shaft 16 are provided with grooved surfaces 20b and 20a, respectively, having complementary grooves therein along their lengthwise direction. A ratchet pawl 21 consisting of a strip of sheet metal is passed through across the casing 14 in parallel with the shaft 16 and is received in a pair of guide holes 22 of the casing 14 at its either end. This ratchet pawl 21 is adapted to engage the wheels 15a and 15b by rotating about its edges abutting the periphery of the guide holes 22. A pair of tension coil springs 23 are engaged between either end of the ratchet pawl 21 and the casing 14 to urge the ratchet pawl 21 into engaging the ratchet wheels 15a and 15b (FIG. 5).

Figure 6:
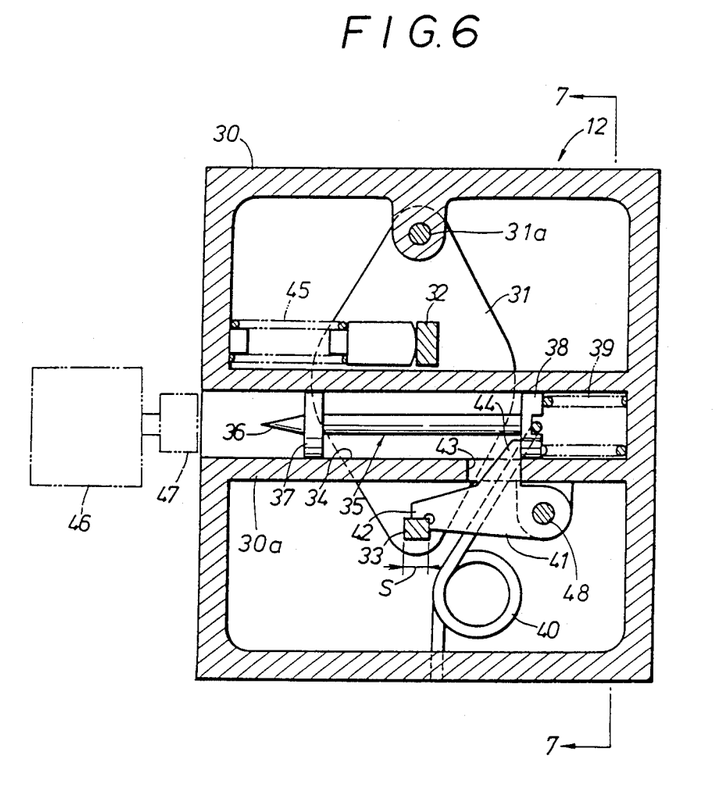
FIG. 6 is a sectional side view of an embodiment of the deceleration sensor according to the present invention.
Figure 7:
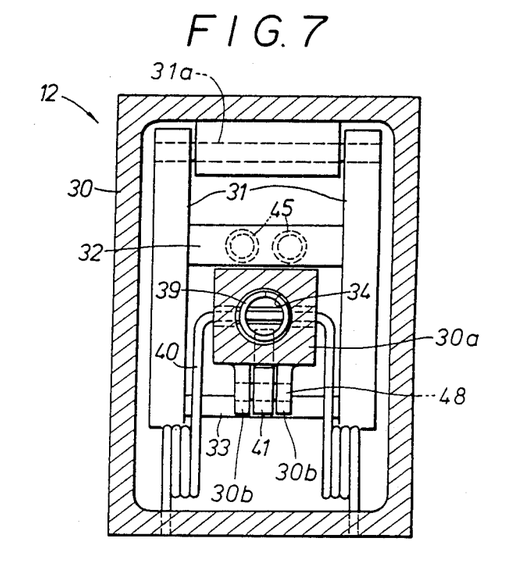
FIG. 7 is a sectional view taken along line VII—VII of FIG. 6.

FIGS. 6 and 7 show the deceleration sensor 12 in a greater detail. In the casing 30 of the deceleration sensor 12 is suspended a sensor mass 31 by a pivot pin 31a at its upper end in the manner of a pendulum. This sensor mass 31 comprises a pair of planar members of an identical shape which are connected by a pair of connecting members 32 and 33 arranged at an appropriate spacing. A guide member 30a of a rectangular cross-section which integrally extends between the opposing inner wall surfaces of the casing 30 is passed through the gap between the two planar members of the sensor mass 31 and between the two connecting members 32 and 33.

A longitudinal bore 34 defined in the guide member 30a guides a firing pin 35 having a pointed front end 36 by way of its two flanges 37 and 38 along its longitudinal direction. To the rear surface of the flange 38 which is provided in the rear end of the firing pin 35 abuts an end of a compression coil spring 39 and an end of a torsion coil spring 40. The other end of the compression coil spring 39 abuts a wall provided at an end of the longitudinal bore 34 while the other end of the torsion coil spring 40 is engaged to the bottom wall of the casing 14, in either case, urging the firing pin 35 in the forward direction or in the direction of the pointed front end 36.

A trigger arm 41 is pivoted by a pin 48 passed through a pair of ear members 30b depending from the guide member 30a. The trigger arm 41 is provided with a pair of free ends 42 and 44; the first free end 42 rests upon the upper surface of the lower connecting member 33 of the sensor mass 31 while the second free end 44 extends into the longitudinal bore 34 by way of a slot 43 provided in a lower part of the guide member 30a and holds the front surface of the flange 38 against the biasing forces of the springs 39 and 40.

Thus, by pressing the firing pin 35 into the longitudinal bore 34 against the biasing forces of the springs 39 and 40, engaging the second free end 44 of the trigger arm 41 with the front surface of the flange 38 of the firing pin 35, and placing the lower connecting member 33 of the sensor mass 31 under the first free end 42 of the trigger arm 41, the firing pin 35 is held in the longitudinal bore 34 in a spring loaded state.

A pair of compression coil springs 45 are interposed between the upper connecting member 32 of the sensor mass 31 and the inner wall surface of the casing 30 to urge the sensor mass 31 in counter clockwise direction in FIG. 6 or in the direction to maintain the engagement between the lower connecting member 33 and the first free end 42 of the trigger arm 41.

A propellant cartridge 46 having a primer 47 is placed adjacent to the open end of the longitudinal bore 34 of the guide member 30a.

Figure 8:
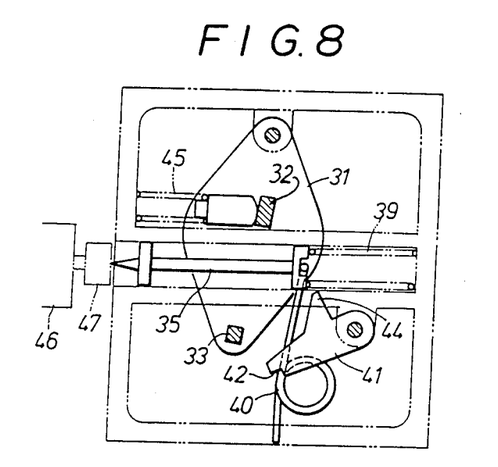
FIG. 8 is a simplified view of the deceleration sensor of FIG. 6 when the sensor mass has disengaged from the trigger arm.
Figure 9:
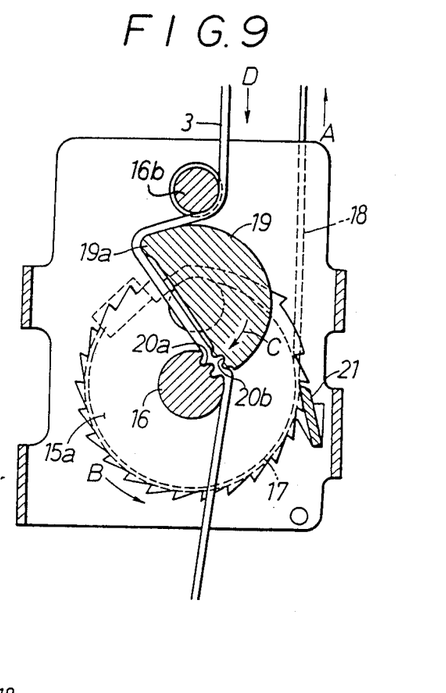
Figure 10:
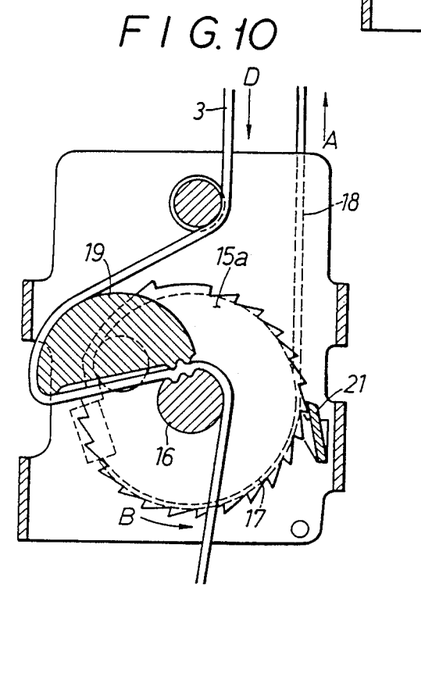

Now the action of this embodiment is described in the following with reference to FIGS. 8 to 10.

When a crash has occurred and a deceleration of a certain level is experienced by the sensor mass 31, the sensor mass 31 rotates about the pivot pin 31a by the inertia force thereof against the biasing force of the compression coil springs 45 and its lower end moves forwardly. This is accomplished because the upper surface of the lower connecting member 33 is flat and horizontal and the lower connecting member 33 is located exactly under the pivot pin 31a. Thus, the first free end 42 of the trigger arm 41 is disengaged from the lower connecting member 33 of the sensor mass 31 with the result that the restraint on the compression coil spring 39 and the torsion coil spring 40 is removed and the firing pin 35 is thrown towards the primer 47 by the spring forces from the compression coil spring 39 and the torsion coil spring 40 (FIG. 8).

When the pointed front end 36 of the firing pin 35 strikes the primer 47, the propellant cartridge 46 is ignited and a thrust is applied to a piston which is incorporated in the drive device 11, thereby pulling the wire 18 in the direction indicated by an arrow A (FIG. 4). As the wire 18 is pulled in the direction of the arrow A, the pulley 17 turns in the direction indicated by an arrow B and a projection 19a of the clamp cam 19 comes into contact with the seat belt 3 as shown in FIG. 9. As a result, the clamp cam 19 is turned in the direction of an arrow C with respect to the ratchet wheels 15a and 15b and the grooved surface 20b of the clamp cam 19 pushes the seat belt 3 against the other grooved surface 20a of the shaft 16 thereby clamping the seat belt 3 against any lengthwise motion thereof as shown in FIG. 9. As the ratchet wheels 15a and 15b are turned further by the tension of the wire 18, the clamp cam 19 pushes the seat belt 3 further sideways against shaft 16b and pulls in the seat belt 3 as indicated by an arrow D in FIG. 10.

Thus, a slack in the seat belt 3 is taken by this motion of the clamp cam 19 and the seat belt 3 can satisfactorily restrain the occupant.

In such a crash detection device or a deceleration detection device, it is necessary that the threshold level of deceleration can be easily and accurately set and that a reliable action is assured without the risk of any erroneous action. To accomplish this goal, in the present embodiment, the sensor mass 31 is directly urged by the compression springs 45 to its engaged state substantially free from undesirable frictions. Thus, the threshold deceleration level can be easily set by adjusting the spring force of the compression coil springs 45 and the mass of the sensor mass 31. Further, that the two springs 39 and 40 are jointly effective in giving a thrust to the firing pin 35 when it is disengaged also contributes to the reliable action of the deceleration sensor since a satisfactory action would be performed even when either one of the two springs were inoperative.

In a deceleration sensor device of the above described structure, if the firing pin is allowed to be thrown with a small displacement of the sensor mass, the sensitivity of the deceleration sensor will be enhanced but the permissible margin of the threshold level is reduced and the control of the threshold level will be made more difficult. Therefore, in the present embodiment, the sensor mass 31 engages the trigger arm 41 at a point which is farther away from the pivot pin 31a than the graviational center of the sensor mass 31. Thus, the stroke of the sensor mass 31 at the lower connecting member 33 where it engages the first free end 42 of the trigger arm 41 is substantially magnified and the distance S which the lower connecting member 33 must move before it disengages the trigger arm 41 can be freely and accurately selected so as to suit the deflection of the compression coil springs 45 for a given level of deceleration.

Furthermore, since the two free ends 42 and 44 which engage the lower connecting member 33 of the sensor mass 31 and the flange 38 of the firing pin 35, respectively, project from the trigger arm 41 in mutually orthogonal directions, the projecting distances of these free ends 42 and 44 can be freely selected and the action of the springs 39 and 40 on the engagement between the lower connecting member 33 and the first free end 42 is minimized to the end of eliminating the interference of the friction due to this engagement on the threshold level of deceleration. Further, since the direction of the motion of the firing pin 35 can be made to agree with the direction of expected deceleration or the expected inertia motion of the firing pin 35, the reliability of the action of the firing pin is enhanced.

FIGS. 11 to 14 show a second embodiment of the deceleration sensor according to the present invention. The casing 52 of this deceleration sensor 51 pivotally support a pair of U-shaped sensor masses 53a and 53b by way of pivot pins 54a and 54b, respectively. One of the sensor masses 53b is accommodated in the other 53a in such a manner that the two sensor masses 53a and 53b can swing about their respective pivot pins 54a and 54b which extend parallel to each other without any interference. The casing member which extends into the interior of the U-shaped inner sensor mass 53b is provided with a longitudinal bore 54 which extends perpendicularly to the pivot pins 54a and 54b the sensor masses 53a and 53b.

A firing pin 56 having a pointed front end 56a and a hollow skirt 56b is received in the longitudinal bore 54. The rear end longitudinal bore 54 is provided with a spring retainer 55 which comprises a front part 55a of a small diameter extending into the open end of the skirt 56b of the firing pin 56, an intermediate part 55b having a diameter which is slightly greater than the inner diameter of the skirt 56b and a base plate 55c which is attached to the rear surface of the casing 52 and closes the rear end 52a of the longitudinal bore 54. The annular spaces defined between the inner surface of the the skirt 56b of the firing pin 56 and the outer surface of the front part 55a of the spring retainer 55 and between the inner surface of the longitudinal bore 54 and the outer surface of the intermediate part 55b of the spring retainer 55 receive a small and a large compression coil spring 57 and 58, respectively, which jointly urge the firing pin 56 forwardly or to the left in FIG. 11.

Figure 11:
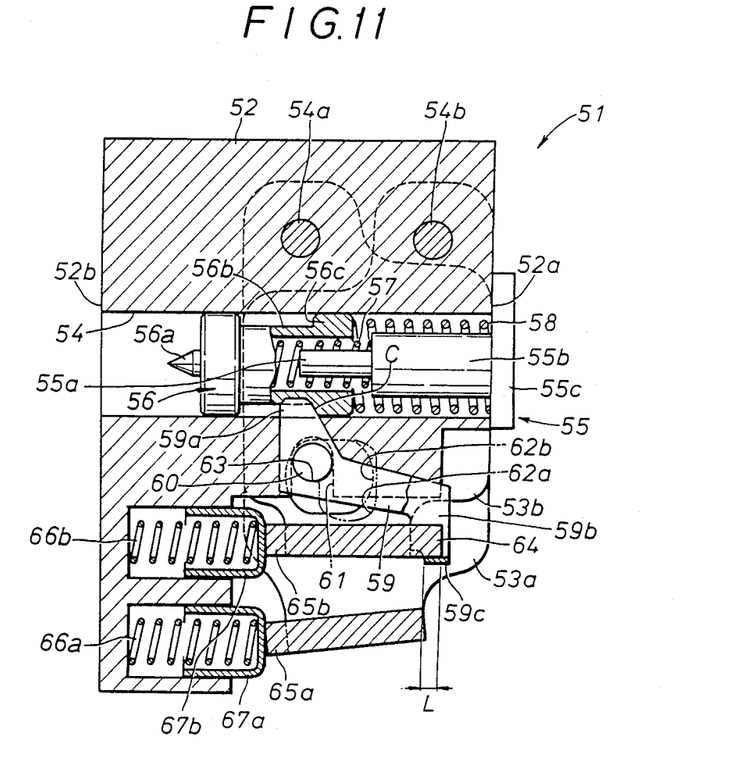
FIG. 11 is a sectional side view of a second embodiment of the deceleration sensor according to the present invention.
Figure 12:
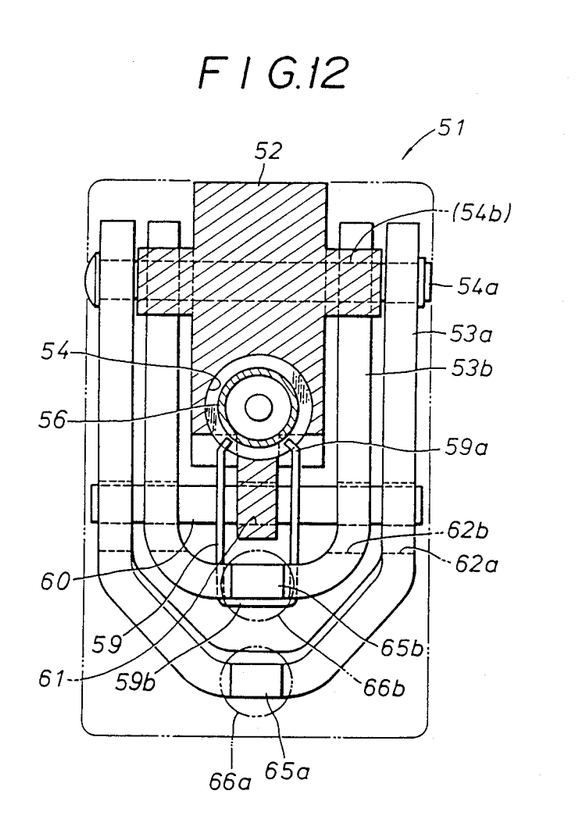
FIG. 12 is a sectional front view of the deceleration sensor of FIG. 11.

A trigger arm 59 is pivoted by a lateral pin 60 which is received at its middle part by a slot 61 formed in the casing 52. As best shown in FIGS. 11 and 12, this slot 61 extends vertically and has an open lower end. The trigger arm 59 is provided with a pair of upper ends which project into the longitudinal bore 54 and engage the front surface of a flange 56c provided integrally with a rear part of the skirt 56b of the firing pin 56 and a pair of lower ends 59b which are joined together by a connecting piece 59c.

Figure 13:
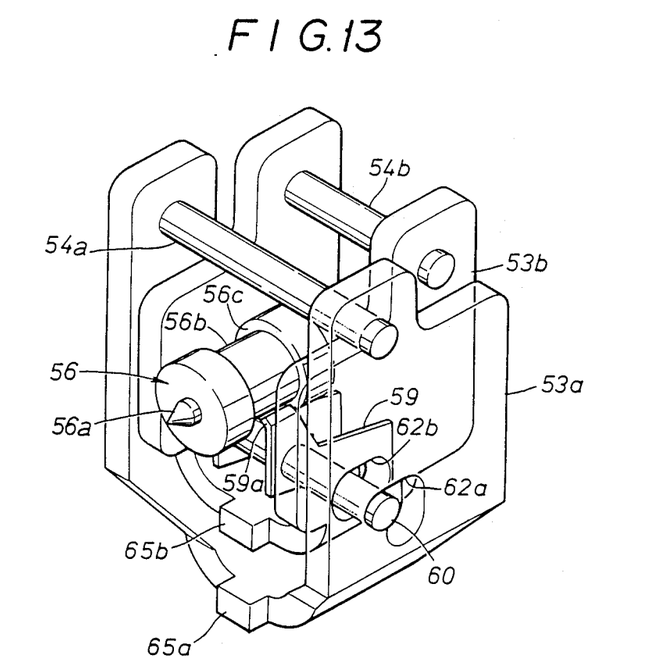
FIG. 13 is a perspective view of the deceleration sensor of FIGS. 11 and 12 with the casing removed to show some of the important features of this embodiment.

Each of the sensor masses 53a and 53b is provided with a pair of holes 62a, 62b for passing the two ends of the lateral pin 60 therethrough. These holes 62a and 62b are substantially greater than the cross-section of the lateral pin 60 to avoid any interference therewith. However, the upper front edge of each of the holes 62a of the sensor mass 53a is provided with a depression 63 which is substantially complementary with the profile of the lateral pin 60 so as to restrict the vertical motion of the lateral pin 60 once it is received in this depression 63. Otherwise, these holes 62a and 62b are large enough to accommodate the downward motion of the lateral pin 60 until the upper ends 59a of the trigger arm 59 are disengaged from the front surface of the flange 56c of the firing pin 56 as the sensor masses 53a and 53b rotate forwardly.

Figure 14:
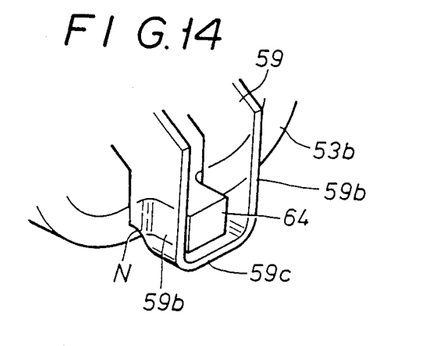
FIG. 14 is a perspective view showing how the lower free end of the trigger arm is engaged with one of the sensor masses.
Figure 15:
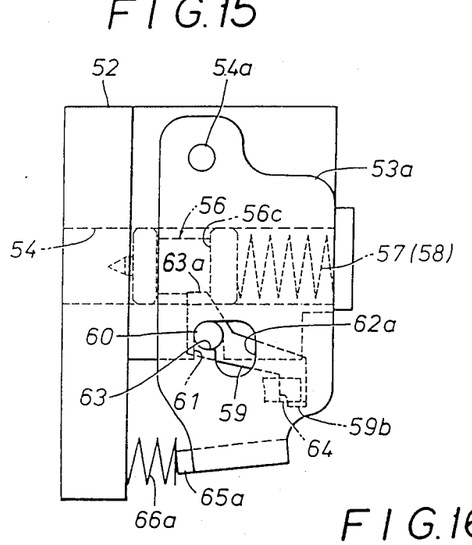
FIGS. 15 to 18 are views similar to FIG. 11 showing the action of various parts as the trigger arm is released.

As best shown in FIG. 14, the rear edge of a lower part of the sensor mass 53b is provided with a tongue 64 which is adapted to rest upon the horizontal and flat upper surface of the connecting piece 59c of the lower ends 59b of the trigger arm 59. Normally, the lateral pin 60 is received in the depressions 63 of the holes 62a of the sensor mass 53a while the connecting piece 59c of the trigger arm 59 is engaged by the tongue 64 in such a manner that the trigger arm 59 is held in the state shown in the drawings although the compression coil springs 57 and 58 urge the upper ends 59a of the trigger arm 59 forwardly by way of the firing pin 56.

The bottom parts of the sensor masses 53a and 53b are provided with frontal projections 65a and 65b, respectively, and compression coil springs 66a and 66b having guide caps 67a and 67b are interposed between depressions provided in the casing 52 and the projections 65a and 65b, respectively, so as to urge the sensor masses 53a and 53b rearwardly.

Now the action of the present embodiment is described in the following with reference to FIGS. 15 to 18.

Normally, the inertia forces acting upon the sensor masses 53a and 53b are insufficient to overcome the biasing forces of the compression coil springs 66a and 66b and the sensor masses 53a and 53b remain stationary. Therefore, the various parts of the deceleration sensor device 51 remain in the states shown in FIG. 15.

Figure 16:
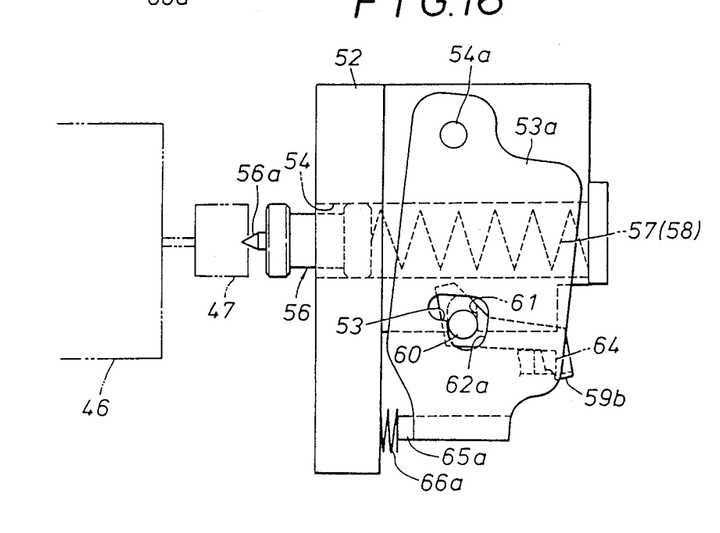
Figure 17:
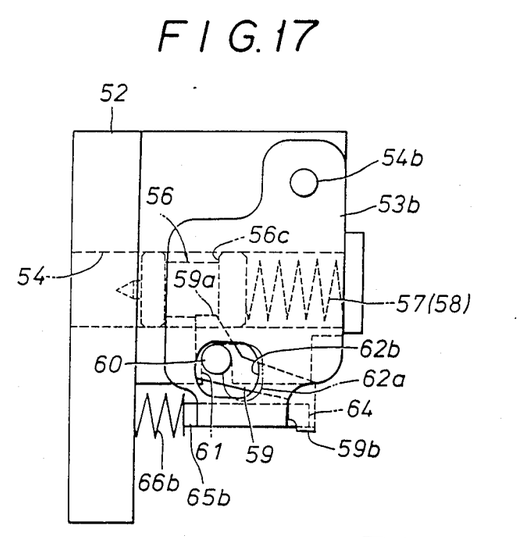
Figure 18:
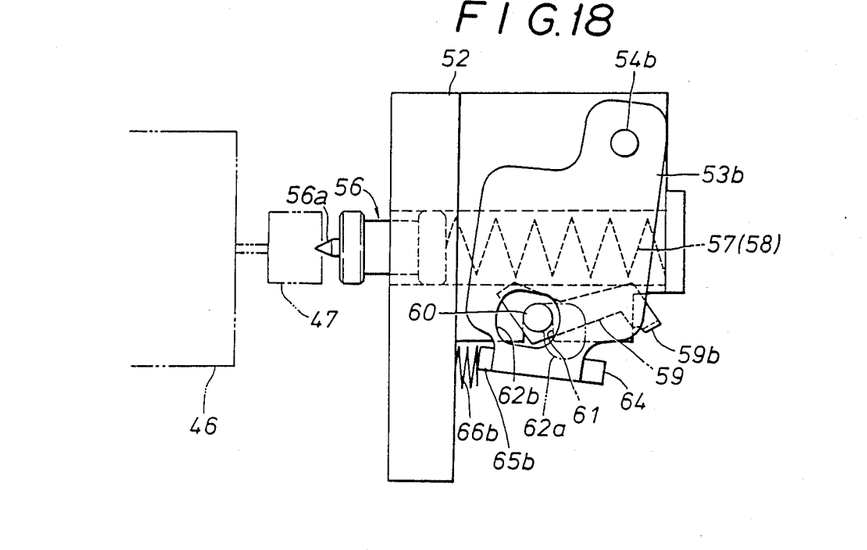

When a vehicle crash occurs and deceleration in excess of a certain threshold value is experienced by the sensor masses 53a and 53b, the inertia forces acting upon the sensor masses 53a and 53b overcome the biasing forces of the compression springs 66a and 66b and the sensor masses 53a and 53b rotate forwards as shown in FIG. 16. As a result, the tongue 64 of the sensor mass 53b is disengaged from the connecting piece 59c of the trigger arm 59. This removes the restraint imposed on the firing pin 56 by the engagement between the flange 56c of the firing pin 56 and the upper ends 63a of the trigger arm 63 and the compression coil springs 57 and 58 propel the firing pin 56 onto the primer 47. Additionally, the forward motion of the sensor mass 53a disengages the lateral pin 60 from the depression 63, thus allowing the lateral pin 60 to drop to the extent permitted by the dimension of the hole 62a. This also removes the restraint imposed upon the firing pin 56 and the compression coil springs 57 and 58 propel the firing pin 56 onto the primer 47.

When the pointed front end 56a of the firing pin 56 strikes the primer 47, the propellant cartridge 46 is ignited in the same way as in the previous embodiment.

Reliability is highly important in such a crash sensor. According to the present embodiment, a pair of sensor masses 53a and 53b are provided and, furthermore, they engage the trigger arm 59 in different ways. Therefore, even when a mechanical seizure took place in the release mechanism associated with either one of the sensor masses, the release mechanism associated with the other sensor mass can release the firing pin and the chance of failure to detect a crash is substantially released. Obviously, under a normal condition, the two release mechanisms can function properly in a redundant manner.

The forces of engagement of the trigger arm to the two sensor masses 53a and 53b depend on the areas of the corresponding contact surfaces. In view of reducing fluctuations in the sensitivities of crash sensors of this type, the dimensional accuracy of the areas of the contact surfaces should be increased to a possible extent. Therefore, according to the present embodiment, as shown in FIG. 14, a notch N is provided in each of the lower ends 59b to avoid a contact between a rounded portion of the root of the tongue 64 and each of the rounded corners of the lower ends 59b of the trigger arm 59. This assures the accuracy of the length L (FIG. 11) of the contact area between the tongue 64 and the connecting piece 59c. Likewise, by forming an area of contact C between each of the upper ends 59a of the trigger arm 59 and the flange 56c of the firing pin 56 with inclined surfaces, smooth disengagement of the flange 56c from the upper ends 59a of the trigger arm 59 is assured.

When an inertia force which is almost but not quite enough to release the trigger arm 59 acts upon the sensor masses 53a and 53b, the states of engagement of the two sensor masses 53a and 53b with the trigger arm 59 are required to be restored to the original states even when slight disturbances may have taken place in the states of engagement. To this end, according to the above described embodiment, the areas of engagement are placed exactly under the pivot pins 54a and 54b of the sensors 53a and 53b, respectively, so that even when there were slight movements in the areas of engagement, since these motions are substantially parallel with the longitudinal direction or parallel with the contact surfaces of the areas of engagement, no mechanical seizure would develop and the states of engagement in these areas would be quickly restored to their original states.

Thus, the reliability of the crash sensor is effectively improved according to the present invention. Although the present invention has been shown and described with reference to the preferred embodiments thereof, it should not be considered as limited thereby. Various possible modifications and alterations could be conceived of by one skilled in the art to any particular embodiment, without departing from the spirit of the present invention.

What we claim is:

1. A vehicle deceleration sensor for detection of deceleration or acceleration greater than a certain threshold level and for releasing energy from an energy source, said sensor comprising:

an energy releasing member;

a sensor mass pivotally mounted for motion along a first direction in a casing and is urged by first biasing means along the first direction so as to oppose an inertia force that will applied to the sensor mass as it experiences deceleration or acceleration which is to be detected;

second biasing means which resiliently urges the energy releasing member in a direction to move said energy releasing member into releasing energy from an energy source; and a trigger member which is moveably supported and comprises a first free end which is adapted to engage the energy releasing member and a second free end which is adapted to engage with an engagement portion of the sensor mass so as to keep the first free end engaged with the energy releasing member against the urging force of the second biasing means under normal condition and to permit the motion of the trigger member to disengage the energy releasing means from the first free end of the trigger member when the sensor mass is subjected to acceleration or deceleration greater than the threshold level.

2. A deceleration sensor as defined in claim 1, wherein the trigger member comprises a trigger arm which is pivoted at its base end.

3. A deceleration sensor as defined in claim 2, wherein the distance of a vector of the biasing force of the second biasing means acting upon the first free end of the trigger arm, via the energy releasing means, from the pivoted base end is smaller than a distance of the vector of the contact force acting between the engagement portion of the sensor mass and the second free end of the trigger arm from the pivoted base end.

4. A deceleration sensor as defined in claim 2, wherein the trigger arm extends substantially horizontally in its unreleased position and its gravitational center is located away from the pivoted base end thereof so that a gravitational fore acting upon the trigger arm assists its motion which is to be effected by the biasing force of the second biasing means, via the energy releasing member.

5. A deceleration sensor as defined in claim 1, wherein the energy releasing member comprises a firing pin which is urged by the second biasing means into a position to ignite a propellant cartridge and is held against the biasing force of the second biasing means by the first free end of the trigger member.

6. A deceleration sensor as defined in claim 5, wherein the trigger member comprises a trigger arm which is pivoted at its base end, and the second biasing means comprises a compression coil spring and a torsion coil spring acting upon the firing pin.

7. A deceleration sensor as defined in claim 5, wherein the trigger member comprises a trigger arm which is pivoted at its base end and the second biasing means comprises a pair of compression coil springs abutting a rear end of the firing pin in a coaxial manner.

8. A deceleration sensor as defined in claim 1, wherein the sensor mass is pivoted to the casing at its upper end, and the engagement portion engages the second free end of the trigger member at an area which is substantially under the pivoted upper end of the sensor mass.

9. A deceleration sensor as defined in claim 8, wherein the sensor mass is provided with an upward facing shoulder surface extending substantially horizontally and the second free end of the trigger member rests upon this shoulder surface of the sensor mass.

10. A deceleration sensor as defined in claim 8, wherein the sensor mass is provided with a downward facing shoulder surface extending substantially horizontally, and the second free end of the trigger member rests upon this shoulder surface of the sensor mass.

11. A deceleration sensor as defined in claim 8, wherein the engagement portion is provided in the sensor mass farther away from the pivot pin than the gravitational center of the sensor mass.

12. A deceleration sensor as defined in claim 1, wherein the sensor mass comprises a pair of sensor masses which engage the trigger member with individual engagement portions in such a manner that even when only one of the engagement portions releases the trigger member the energy releasing member is activated by the trigger member.

13. A deceleration sensor as defined in claim 12, wherein the sensor masses are pivoted independent from each other at their upper ends and are biased by individual first biasing means; and the trigger member consists of a trigger arm comprising a lateral pivot pin which is guided for a vertical motion by a vertical slot of the casing and held by an upward facing shoulder surface of one of the sensor masses, the first free end which is engaged with the energy releasing member to prevent said member from being activated by the second biasing means and the second free end which is engaged with a shoulder surface of the other sensor mass in such a manner that the first free end is allowed to be driven by the second biasing means either when the lateral pin is disengaged from the upper shoulder surface of the one sensor mass and the trigger arm is pivoted about the second free end thereof by the energy releasing member under the biasing force of the second biasing means or when the second free end is disengaged from the shoulder surface of the other sensor mass and the trigger arm is pivoted about the lateral pin by the energy releasing member under the biasing force of the second biasing means, in either case, due to a displacement of the corresponding sensor mass under the inertia force.

14. A deceleration sensor as defined in claim 13, wherein the lateral pin is provided in a part of the trigger arm located between the first free end and the second free end of the trigger arm, and the shoulder surface of the other sensor mass which engages with the second free end faces downward.

15. A deceleration sensor as defined in claim 13, wherein the sensor masses are substantially U-shaped and one of them is accommodated inside the other without interfering each other.

16. A deceleration sensor as defined in claim 13, wherein the sensor masses are provided with individual pivot pins which pivot them at their upper ends and these pivot pins are laterally spaced from each other; the shoulder surfaces of the sensor masses being located substantially under the corresponding pivot pins belonging to the same sensor masses, respectively.

17. A deceleration sensor as defined in claim 1, wherein a direction in which the energy releasing member is urged by the second biasing means is substantially identical to the direction of the inertia force which will be applied to the sensor mass.

18. A vehicle deceleration sensor for detection of deceleration in a given direction greater than a predetermined threshold level and for releasing energy from an energy source when said deceleration exceeds said threshold level, said sensor comprising:
  sensor mass means, pivotally mounted for movement in said deceleration direction;
  first biasing means for resisting movement of said sensor mass means in said deceleration direction;
  energy releasing means, mounted for movement in a first direction;
  second biasing means for urging said energy releasing means in said first direction;
  trigger member means, responsive to movement of said sensor mass means in said deceleration direction, for releasably preventing said energy releasing means from moving in said first direction when said deceleration is below said predetermined threshold level and for releasing said energy releasing means to move in said first direction when said deceleration is above said predetermined threshold level, wherein said sensor mass means comprising a pair of planar members connected by a pair of spaced apart connecting members, said pair of planar members being mounted for pivotal movement in a plane parallel to said planar members;
  said trigger member means includes means for pivotally mounting said trigger member for at least partial rotation about a pivot axis, said trigger member means including a latch means for engaging said energy releasing means and preventing movement of said energy releasing means in said first direction during latching engagement, said trigger member means further including a free end in contact with one of said connecting members so as to prevent rotation of said latch means out of said latching engagement when said deceleration is below said predetermined threshold value.

* * * * *